United States Patent [19]

Samuels et al.

[11] Patent Number: 5,053,797

[45] Date of Patent: Oct. 1, 1991

[54] SYSTEM FOR UPDATING SOFTWARE IN AUTOMATIC FILM PROCESSOR

[75] Inventors: James T. Samuels; Roger D. Ellsworth, both of Rochester, N.Y.

[73] Assignee: Eastman Kodak Company, Rochester, N.Y.

[21] Appl. No.: 504,742

[22] Filed: Apr. 4, 1990

[51] Int. Cl.$^5$ .............................. G03D 3/08
[52] U.S. Cl. .................... 354/322; 354/297; 364/900
[58] Field of Search ........ 354/297, 298, 299, 319-323, 354/324-327; 355/40, 41, 42; 364/405, 900

[56] References Cited

U.S. PATENT DOCUMENTS 4,300,828 11/1981 Kaufmann ........................ 354/322
4,332,456 6/1980 Kaufmann ........................ 354/298
4,419,738 12/1983 Takahashi et al. ................ 364/900

Primary Examiner—L. T. Hix
Assistant Examiner—Howard B. Blankenship
Attorney, Agent, or Firm—G. Herman Childress

[57] ABSTRACT

An automatic film processor having control circuitry including a microprocessor and an electrically alterable programmable read-only memory (EAPROM) with a stored main program for control of the processor, has an auxiliary read-only memory (ROM) containing a bootstrap program including instructions for reprogramming the EAPROM using addresses and data from a disk drive or RS232 port. Reprogramming occurs in response to manual or automatic setting of a switch, without physically removing or replacing the EAPROM.

1 Claim, 3 Drawing Sheets

SYSTEM FOR UPDATING SOFTWARE IN AUTOMATIC FILM PROCESSOR

The present invention relates to automatic processors of film and similar photosensitive media, in general; and, in particular, to a system for updating processor control circuitry software by downloading software from an external source by means of reprogramming an on-board programmable read-only memory without removal thereof.

BACKGROUND OF THE INVENTION

Photosensitive media processors, such as the Kodak X-OMAT processors, are useful in applications such as the automatic processing of radiographic films for medical imaging purposes. The processors automatically transport sheets or webs of photosensitive film, paper or the like (hereafter "film") from a feed end of a film transport path, through a sequence of chemical processing tanks in which the media is developed, fixed, and washed, and then through a dryer to a discharge or receiving end. The processor typically has a fixed film path length, so final image quality depends on factors including transport speed which determines length of time the film strip is in solution, and the temperature and composition of the processing chemicals (the processor "chemistry").

In a typical automatic processor of the type to which the invention relates, film transport speed is set at a constant rate and the chemistry is defined according to a preset recommended temperature, e.g. 93° F., with a specified tolerance range of $+/-X°$ F. A temperature control system is provided in the processor to keep the chemicals within the specified range.

Conventional processors usually include a film width sensor in the form of a reflective infrared sensor array adjacent a feed entrance opening, and may also include a feed detector in the form of a Hall effect switch or the like for detecting separation of entrance rollers due to the passage of film sheets at the front end of the transportation path. The film width sensor not only provides an indication of the width of a sheet entering the processor, but may also provide an indication of the occurrence of the leading edge and trailing edge of each sheet, since the signals from the film width sensor will change significantly as each leading and trailing edge is encountered. Information as to leading and trailing edge occurrences and width of the film, taken with prior knowledge of the constant transport speed, is used to keep track of cumulative total film surface area processed in order to guide chemistry replenishment control. The use of a separate entrance roller detector signals that a sheet of film has actually entered the nip of the first roller pair, and is not just sitting still on the film guide under the width sensor.

Although conventional processors used for radiographic image processing are traditionally configured to operate at a constant film transport speed, modifications may be made through gear changes and the like to vary the process. Moreover, new processors are being introduced which are usable in more than one mode. The mode is often referred to in shorthand fashion by a nominal film transport "drop time", which may be defined as the time from entry of the leading edge of a sheet of film at the feed end until exit of the trailing edge of the same sheet of film at the discharge end. Conventional processors operate in standard (90 second), rapid (45 second), or "Kwik" (30 second) mode, and can be varied to operate in an extended-cycle mode, such as described in L. Taber & A. G. Hans, "Processing of Mammographic Films: Technical and Clinical Consideration," *Radiology*, Vol. 173, No. 1, pages 65-69, October 1989. In the latter mode, processor speed is lowered and chemistry temperature is raised to enhance image contrast for better detection of changes in density of fibrous tissue. The new processors will be settable as to run parameters, including transport speed in order to be able to use the same processor for multiple processing modes.

The operations and functions of such processors are typically handled under control of electronic circuitry including a microcomputer connected to various process sensors and subsidiary controls to receive and dispense electronic signals in accordance with predefined software program instructions. Examples of such control circuitry are shown in U.S. Pat. No. 4,300,828 and in copending, commonly-owned U.S. patent application Ser. No. 07/494,647, entitled "Processor with Temperature Responsive Film Transport Lockout," filed Mar. 16, 1990, the disclosures of which are incorporated herein by reference thereto. The microcomputer may comprise a microprocessor, input/output interface circuitry and one or more memory units, including a read-only memory element (ROM) which contains program instructions and data, such as data in the form of lookup tables. Provision is made in the memory map for a bootstrap memory plane which serves to initiate the system and load the main program at system start-up. Present software updating in processors employing such ROMs is accomplished by physically extracting the memory module from its socket on the control circuit board and inserting a new module including the changed software in its place. Such physical replacement involves equipment downtime and attention by technically trained service personnel. It also entails an unnecessary degree of risk of damage to the memory modules and other processor components due to physical handling.

It is desirable to be able to update product software in the field without having to physically replace components, with less time required by technical service personnel, and with less risk that the modules or processor might be damaged during the updating process. In particular, it is desirable to be able to update processor control circuitry software by downloading software from an external source by means of reprogramming an on-board ROM without removing it from the processor.

Programmable read-only memories (PROMs), such as electrically alterable or erasable PROMs (EAPROMs or EEPROMs), are known which can be erased and reprogrammed by connecting the same within a programmer after removal of the PROM from its primary operating site. The reprogramming of ultraviolet erasable PROMs by means of a minicomputer-controlled programmer is described in F. McIntosh et al., "A Minicomputer-Controlled Read-Only-Memory Programmer" *Int. J. Electronics* 1979, Vol. 46, No. 2, pp. 193-204. The updating of product software by reprogramming a ROM forming a part of the control circuitry of an automatic film processor without removing the ROM from its normal placement position in the processor is not heretofore known.

SUMMARY OF THE INVENTION

It is an object of the present invention, in connection with apparatus for the automatic processing of film or similar photosensitive media to provide a system for updating product software by downloading software from an external source by means of reprogramming a programmable read-only memory (PROM) element of a processor control circuitry, without physically removing the PROM itself.

In accordance with the invention, a processor of exposed photosensitive media having means for automatically transporting film along a path through developer, fixer, wash and dryer station under control of a microcomputer including software stored on a programmable read-only memory (PROM) element, further comprises means for executing a sequence of instructions for reprogramming the PROM to change the PROM-located software in accordance with a sequence of address and data input to the processor from an external source.

In one aspect of the invention, a microprocessor is connected for switching between a reprogrammable main ROM element that contains the usual instructions and data normally associated with processor control operations, and an auxiliary ROM element containing a sequence of instructions and data for undertaking the reprogramming of the main ROM in accordance with addresses and data supplied from an external source such as a floppy disk drive, or an RS232 or the like communications link connected to receive information from a modem, laptop computer, or similar external device.

BRIEF DESCRIPTION OF THE DRAWINGS

Embodiments of the invention have been chosen for purposes of description and illustration, and are shown in the accompanying drawings, wherein.

Throughout the drawings, like elements are referred to by like numerals.

DETAILED DESCRIPTION OF PREFERRED EMBODIMENTS

Figure 1:
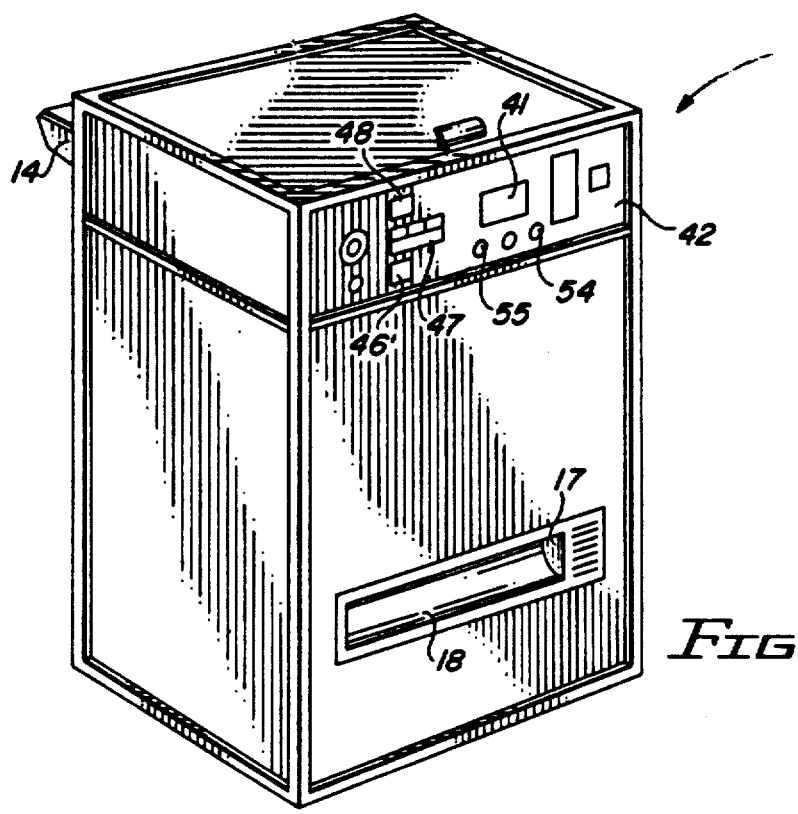
FIG. 1 is a perspective view of a processor in which a software downloading system in according with the present invention can be employed.

The principles of the invention are illustrated, by way of example, embodied in the form of a software updating system suitable for use with a processor 12 (FIGS. 1 and 2) for the automatic processing of photosensitive media in the form of sheets of film F (FIG. 2), such as for the development of radiographic images for medical diagnostic purposes.

Figure 2:
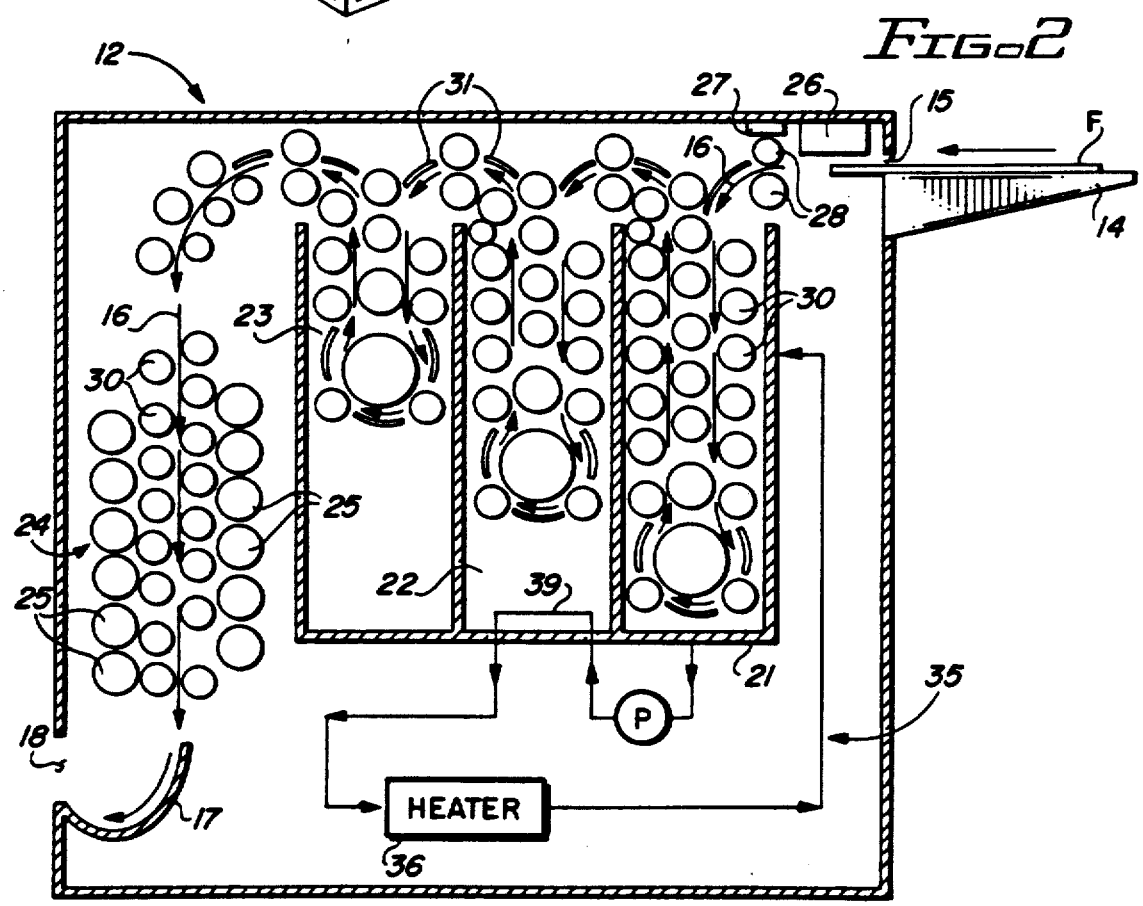
FIG. 2 is a schematic representation of the processor of FIG. 1.

The processor 12 has a feed shelf 14 positioned ahead of an entrance opening 15 (FIG. 2). The front end of the processor 12 including feed shelf 14 and entrance opening 15 is located in a darkroom to avoid unwanted exposure of the sheets F fed into the processor 12. The remaining portion of the processor 12 may be outside the darkroom. Sheets F entered through entrance opening 15 are transported through the processor 12 along a travel path 16 (indicated by arrows), and are eventually driven out of the back end of processor 12 into a catch bin 17 at an exit opening 18.

The processor 12 includes a developing station comprising a tank 21 filled with developer chemical; a fixing station comprising a tank 22 filled with fixer chemical; and a wash station comprising a tank 23 filled with wash water or comprising some other appropriate film washing device. Processor 12 also includes a drying station 24 comprising oppositely-disposed pluralities of air dispensing tubes 25 or some other appropriate film drying mechanism.

Positioned proximate opening 15 is a sensor 26, such as a conventional universal film detector board, reflective infrared sensor array which provides signals indicative of sheet width when a sheet F is presented at the entrance opening 15. The film width sensor 26 also provides an indication of the occurrence of passage of the leading edge and trailing edge of each sheet past point 26 of the processor 12. A second sensor 27 may be provided to detect separation of entrance rollers 28 to signal the beginning of transportation of a sheet of film F along the path 16.

In FIG. 2, the sheet path 16 is shown as defined by a plurality of film transport rollers 30 and a plurality of guide shoes 31 located to direct a sheet of film F sequentially through the tanks 21, 22, 23 and dryer 24. The rollers 30 form the transport system for transporting the sheets F through the processor 12. Crossover assemblies act at the interfaces between the respective tanks 21, 22, 23 and dryer 24 to transport sheets between the corresponding stations. Rollers 30 may be driven in conventional manner by a common drive shaft 33 (FIG. 3) having alternating right-hand and left-hand axially-spaced worms for driving adjacent columns of rollers 30 at the same speed in counterrotation, so as to move the sheets F in the direction of the arrows along path 16. Drive shaft 33 may be connected by a no slip chain drive and toothed sprockets (not shown) to be driven by an electric motor 34 such as, for example, a variable speed brushless DC motor.

The temperature of developer chemical in tank 21 may be controlled by means of a recirculation plumbing path 35 (FIG. 2) having a pump P for drawing developer out of tank 21, through a thermowell or other suitable heater 36, and then passing it back to the tank 21. A temperature sensor 37 (FIG. 3) is provided in the tank 21 or recirculation path 35 to monitor the temperature of the developer. Developer temperature may be displayed on a meter 41 located on an exterior control panel 42 of the processor 12. Temperature control of fixer chemistry may be conveniently provided by passing an immersed loop 39 through the fixer tank 22.

Figure 3:
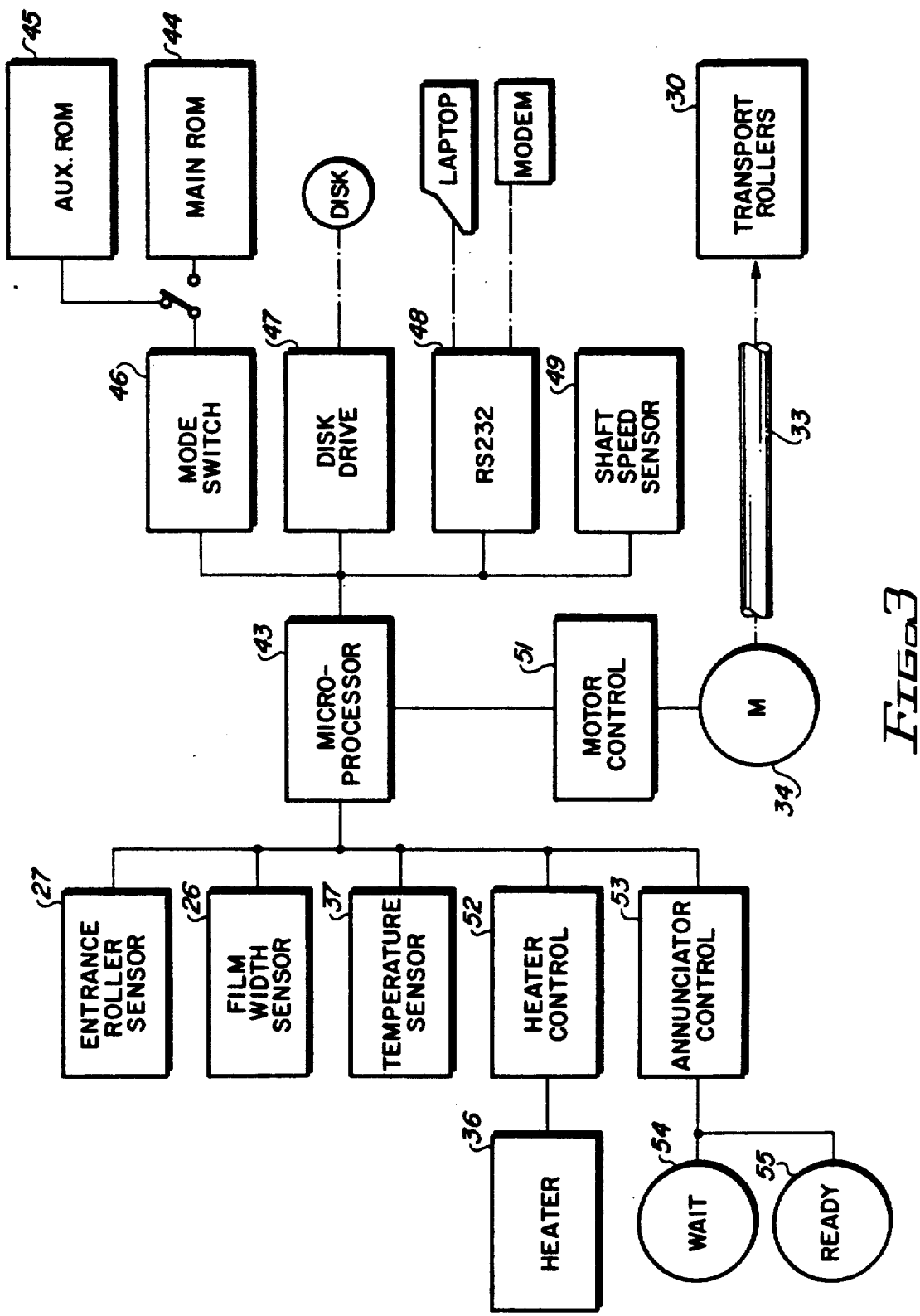
FIG. 3 is a block diagram of an embodiment of control circuit in accordance with the system of the present invention.

FIG. 3 illustrates processor control circuitry usable in implementing an embodiment of the present invention. As shown in FIG. 3, a microcomputer includes a microprocessor 43 connected as shown to direct the operation of the processor 12. Microprocessor 43 receives software instructions for its operation from a main read-only memory (ROM) processor 44 or an auxiliary read-only memory (ROM) 45 in accordance with the setting of a mode switch 46, as to whether programming or normal mode of operation is desired. In the normal mode of operation, microprocessor 43 will access the main ROM 44 using sequentially generated addresses in accordance with known techniques to retrieve program instructions and data for use in exercising the control function. In the prcgramming mode of operation, microprocessor 43 will direct the reprogramming of the main ROM 44, as described further below, using instructions retrieved from the auxiliary ROM 45.

One way to implement mode switch 46 is by means of a switch 46' provided on the control panel 42 (FIG. 1) for manual user-implemented selection between normal and programming modes. The switch can also be implemented by software means in the main program, providing a shift between ROM's 44, 45 in response to the presence of a disk in a disk drive 47 or in response to a signal received at an RS232 port 48 (FIG. 1) from an external laptop computer or modem (not shown). The main program can be configured to periodically check for the presence of a mode switching signal, e.g. every five seconds.

Microprocessor 43 is also connected to receive input information from the film width sensor 26, the entrance roller sensor 27, the developer temperature sensor 37 and a shaft speed sensor 49. Microprocessor 43 is also connected to motor control circuitry 51, heater control circuitry 52, and annunciator control circuitry 53. Circuitry 51 controls the motor M; circuitry 52 controls the heater 36; and circuitry 53 controls "WAIT" and "READY" indicator lights 54, 55.

Figure 4:
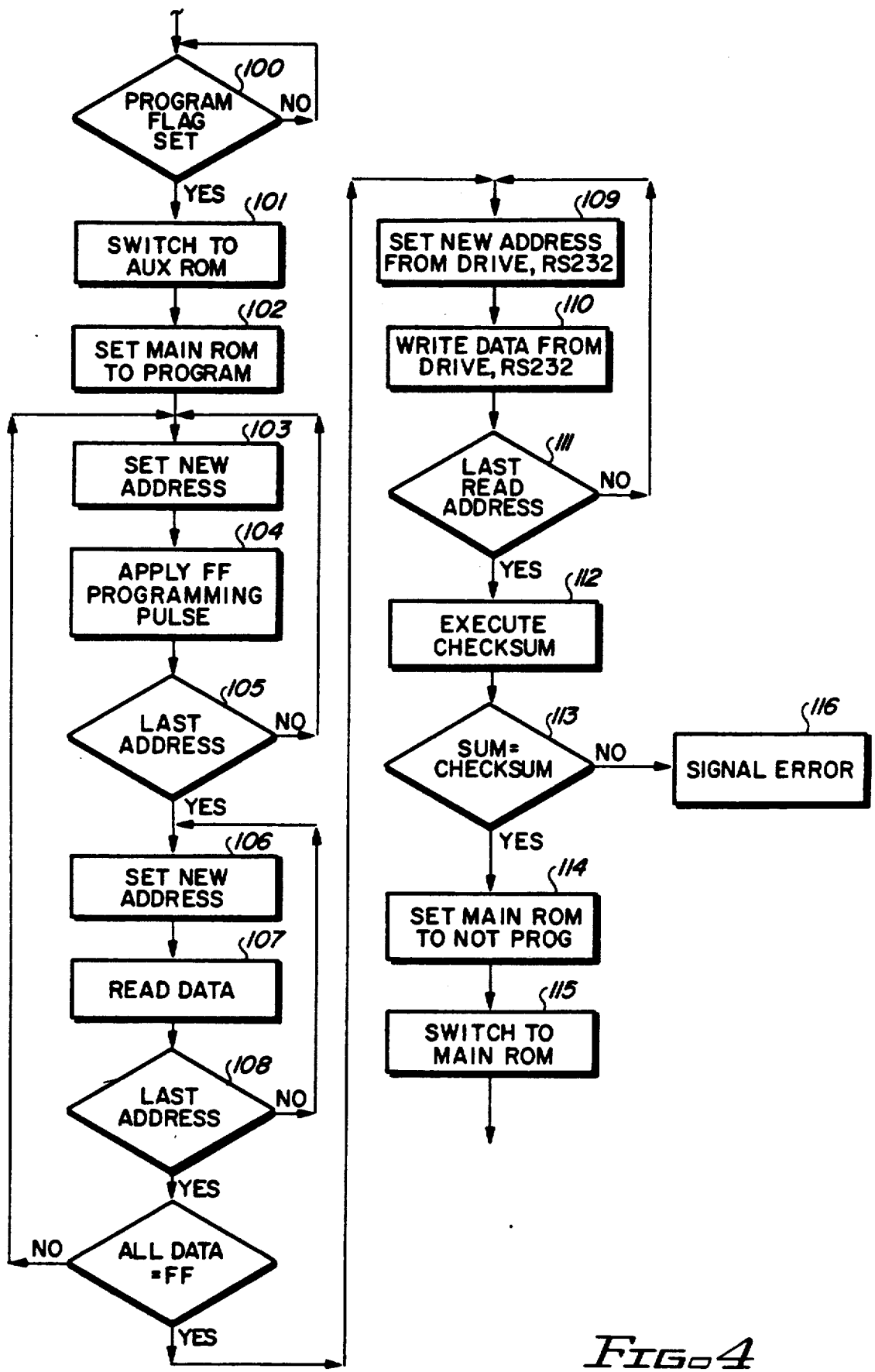
FIG. 4 is a flow diagram of the operation of the system of FIG. 3.

In accordance with the invention, as indicated in the flow diagram of FIG. 4, in response to a change of mode flag, switch 46 changes the control circuit configuration from one of normal operation to one of software reprogramming. Microprocessor 43 is connected to receive a "bootstrap" program set of instructions from auxiliary ROM 45 to cause the erasure (i.e., overwriting with FFs) of the main ROM 44 and subsequent reprogramming of the same in accordance with addresses and data retrieved from an external source.

The programming mode flag is detected at 100 in response to manual setting of the mode switch 46 or signal received from the disk drive 47 or the RS232 interface 48. This connects the auxiliary ROM 45 to send instructions to the microprocessor 43 and sets the main ROM 44 into its programming mode (101, 102). For a main ROM 44 in the form of an EEPROM such as commercially available from Intel having a "not chip select/right enable" (CS WE) line, the TTL level is changed (i.e., raised to +12 V), putting the PROM chip in program mode. Erasure (i.e., overwrite to FFs) then occurs by sequentially applying programming pulses to the chip programming input and cycling through all addresses of the chip (103, 104, 105). The erasure (i.e., overwrite) is then verified by reading out all address locations of the main ROM 44 to verify that all locations contain FF (106, 107, 108). If the memory 44 has not been cleared, the erasure process is repeated.

Once erasure is complete, the updated software is written into the main ROM 44 in accordance with addresses and data furnished from a disk in disk drive 47, or a laptop or remote computer or other data source connected to the RS232 port 48. The appropriate address and data are presented at TTL levels and, depending on the nature of the EEPROM, a single or multiple pulses are applied to the programming input in accordance with known programming techniques (109, 110, 111). Thereafter, the contents of all the addresses of the main PROM 44 are read out and their accuracy confirmed such as by means of a "checksum" or similar procedure. The "checksum" value may be read from the external source together with the remainder of the updated program, as one of the blocks entered by address in a block-by-block transfer of the updated program (e.g., address lines A0–A9 and data lines D0–D7) from the external source (e.g., a floppy disk memory storage device) to the on-board main PROM 44. If the "checksum" is valid (112, 113), the switch 46 is actuated to return the control circuitry back to its normal operating state (114, 115). If the "checksum" does not confirm, an error signal may be actuated (116) at once, or after several automatic retries of steps 109–113. "Read," "write," and "programming" indicators (not shown) may optionally be provided on the control panel. The programmer structure may take a form similar to that described in the McIntosh et al. article, referenced above, the disclosure of which is incorporated herein by reference; however, tailored to the type of EEPROM used and overlain on the normal control circuitry of the film processor. The steps of flow chart FIG. 4 are modified as necessary for the selected EEPROM characteristics.

A system for updating software in an automatic film processor in accordance with the invention, as thus described, permits the effective replacement of a superseded ROM program with a new version, without the necessity for physically mechanically disturbing the main ROM in any way. The system may be set so that the code in the auxiliary ROM (which may also be a PROM) may include a normal bootstrap program which is executed first before control is turned over to the main ROM for executing the main program. The auxiliary ROM will contain a program which is executed in predetermined sequence when the mode switch indicates a main ROM programming mode. The system of the present invention enables the product software to be changed without risk of damage due to mechanical displacement. Should the new program be faulty in some way, the prior program can be reloaded.

Those skilled in the art to which the invention relates will appreciate that other substitutions and modifications can be made to the described embodiments without departing from the spirit and scope of the invention as described by the claims below.

What is claimed is:

1. In apparatus for the automatic processing of exposed photosensitive media, said apparatus having means for automatically transporting said media from a feed point along a path through developer, fixer, wash and dryer stations and control circuitry including a microprocessor and a programmable read-only memory associated with said microprocessor to provide stored program information thereto for controlling said processor operations, a method of updating said stored program information without removal of said programmable read-only memory, comprising the steps of:

switching said control circuitry from a normal mode in which said microprocessor is connected to receive program information from said programmable read-only memory, to a programming mode in which said microprocessor is connected to receive program information from an auxiliary read-only memory; and reprogramming said programmable read-only memory by said microprocessor acting in response to program information from said auxiliary read-only memory using address and data information obtained from an external source.

* * * * *